US012580200B2

(12) United States Patent
Peng et al.

(10) Patent No.: US 12,580,200 B2
(45) Date of Patent: Mar. 17, 2026

(54) COMPOSITE POSITIVE ELECTRODE CURRENT COLLECTOR, ELECTRODE PLATE AND SECONDARY BATTERY

(71) Applicant: CONTEMPORARY AMPEREX TECHNOLOGY (HONG KONG) LIMITED, Hong Kong (CN)

(72) Inventors: Jia Peng, Ningde (CN); Mingling Li, Ningde (CN); Xin Liu, Ningde (CN); Qisen Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 638 days.

(21) Appl. No.: 17/984,276

(22) Filed: Nov. 10, 2022

(65) Prior Publication Data

US 2023/0112962 A1 Apr. 13, 2023

Related U.S. Application Data

(63) Continuation of application No. PCT/CN2021/122597, filed on Oct. 8, 2021.

(51) Int. Cl.
*H01M 4/66* (2006.01)
*H01M 4/04* (2006.01)
(52) U.S. Cl.
CPC ......... *H01M 4/667* (2013.01); *H01M 4/0404* (2013.01); *H01M 4/663* (2013.01); *H01M 4/668* (2013.01)
(58) Field of Classification Search
CPC ........ H01M 4/04; H01M 4/0404; H01M 4/66; H01M 4/663; H01M 4/667; H01M 4/668

USPC .......................................................... 429/520
See application file for complete search history.

(56) References Cited

U.S. PATENT DOCUMENTS

| | | | |
|---|---|---|---|
| 10,714,757 | B2 | 7/2020 | Liang et al. |
| 10,910,652 | B2 | 2/2021 | Liang et al. |
| 2014/0147675 | A1 | 5/2014 | Han et al. |
| 2018/0034031 | A1* | 2/2018 | Hammond-Cunningham et al. .... H01M 12/08 |
| 2018/0040874 | A1 | 2/2018 | Zhamu et al. |
| 2018/0040900 | A1 | 2/2018 | Zhamu et al. |
| 2019/0173090 | A1 | 6/2019 | Liang et al. |
| 2019/0173093 | A1 | 6/2019 | Liang et al. |

(Continued)

FOREIGN PATENT DOCUMENTS

| | | |
|---|---|---|
| CN | 103515119 A | 1/2014 |
| CN | 103579632 A | 2/2014 |

(Continued)

OTHER PUBLICATIONS

International Search Report mailed on May 30, 2022, received for PCT Application PCT/CN2021/122597, filed on Oct. 8, 2021, 7 pages including English Translation.

(Continued)

*Primary Examiner* — Kevin P Kerns
(74) *Attorney, Agent, or Firm* — XSENSUS LLP

(57) ABSTRACT

A composite positive electrode current collector may include a protective layer, a graphene metallization layer and a conductive layer arranged in sequence on a surface of an insulation layer. The protective layer may include a metal oxide, and the graphene metallization layer may contain highly reduced graphene oxide having an oxygen-containing organic group.

19 Claims, 6 Drawing Sheets

(56)  References Cited

U.S. PATENT DOCUMENTS

2019/0393486  A1*  12/2019  He et al.  .............  H01M 4/1395
2021/0119196  A1   4/2021  Li et al.
2021/0296654  A1   9/2021  Liang et al.

FOREIGN PATENT DOCUMENTS

| | | | |
|---|---|---|---|
| CN | 109873160 | A | 6/2019 |
| CN | 109873164 | A | 6/2019 |
| CN | 109873165 | A | 6/2019 |
| CN | 110660957 | A | 1/2020 |
| CN | 110660998 | B | 12/2020 |
| JP | 2015-109270 | A | 6/2015 |
| JP | 2019-102427 | A | 6/2019 |
| JP | 2019-102429 | A | 6/2019 |
| JP | 2019-525420 | A | 9/2019 |
| KR | 2019-0040261 | A | 4/2019 |
| KR | 2019-0117923 | A | 10/2019 |

OTHER PUBLICATIONS

Office Action issued Dec. 3, 2024 in Korean Patent Application No. 10-2022-7029355 with English translation thereof.
Notice of Reasons for Refusal issued Dec. 11, 2023 in Japanese Patent Application No. 2022-551359 with machine English translation thereof.

\* cited by examiner 104          102                                    101          103

5

1

COMPOSITE POSITIVE ELECTRODE CURRENT COLLECTOR, ELECTRODE PLATE AND SECONDARY BATTERY

CROSS REFERENCE TO RELATED APPLICATION

The present application is a continuation of International Application No. PCT/CN2021/122597, filed Oct. 8, 2021, the entire content of which is incorporated herein by reference in its entirety.

TECHNICAL FIELD

The present application relates to the technical field of secondary batteries, and in particular, to a composite positive electrode current collector containing graphene, and an electrode plate and a secondary battery using the current collector.

BACKGROUND

Lithium-ion secondary batteries have been widely applied in electric vehicles and consumer electronic products due to their advantages such as high energy density, high output power, and low environmental pollution. However, a long cycle life of the lithium-ion secondary batteries is an eternal problem.

Existing composite current collectors are usually formed by stacking an insulation layer, a protective layer and a conductive layer in sequence (CN109873165A). In the composite current collectors, falling off of the conductive layer is one of reasons that seriously hinders the long cycle life of the secondary batteries.

SUMMARY

Problems to be Solved by the Present Disclosure

Problems to be solved by the present disclosure is to prevent or reduce damage or water absorption degradation of a protective layer caused by moisture in an electrolytic solution or air, improve a bonding force between layers in a composite positive electrode current collector, prevent a conductive layer from falling off, and enhance mechanical strength of the composite positive electrode current collector and an electrode plate, so as not to affect a cycle life.

Specifically, the inventors have found through continuous exploration that in the process of making an electrode plate, when a composite current collector is cold-pressed to make the electrode plate, the electrode plate is under the action of pressure, an active substance and the composite current collector will both extend to a certain degree, and elongation rates of an insulation layer, a conductive layer and a protective layer are inconsistent, which results in certain microcracks in the conductive layer and the protective layer in the composite current collector. After liquid injection and complete infiltration of the electrode plate, the microcracks will increase a contact area between an electrolytic solution and the protective layer. In a positive electrode current collector whose protective layer is composed of a metal oxide, the protective layer will react with corrosive substances in the electrolytic solution, which results in the destruction of the protective layer, affects a bonding force between the protective layer and the conductive layer and the insulation layer, results in falling off of the conductive layer during use of the electrode plate, and affects a cycle life.

In addition, the inventors have also found that when the composite current collector is manufactured, if humidity in the manufacturing environment exceeds a standard, the oxide of the protective layer will absorb moisture, which affects deposition of the conductive layer on the protective layer, further affects the bonding force of the protective layer and the conductive layer and the insulation layer, and also results in falling off of the conductive layer during use of the electrode plate, and affects the cycle life.

Technical Solutions for Solving Problems

The present application is made in view of the above technical problems, and its purpose is to provide a composite positive electrode current collector, which can prevent or reduce damage or water absorption degradation of a protective layer caused by moisture in an electrolytic solution or air, improve a bonding force between layers in a composite current collector, especially a composite positive electrode current collector, prevent a conductive layer from falling off, and enhance mechanical strength of the composite positive electrode current collector and an electrode plate, and realize a long cycle life.

In order to achieve the above purpose, a first aspect of the present application provides a composite positive electrode current collector, where on a surface of an insulation layer, a protective layer, a graphene metallization layer and a conductive layer are arranged in sequence; and the protective layer is composed of a metal oxide, and the graphene metallization layer contains highly reduced graphene oxide having an oxygen-containing organic group.

As a result, it is possible to prevent or reduce damage or water absorption degradation of a protective layer caused by moisture in an electrolytic solution or air, improve a bonding force between layers in a composite positive electrode current collector, prevent a conductive layer from falling off, and strengthen mechanical strength of a composite positive electrode current collector, and improve a cycle life.

In a preferred embodiment, the highly reduced graphene oxide is composed of graphene having two to six layers.

In this way, conductivity and the number of functional groups of a material can be better balanced, the number of covalent bonds is allocated, and a more coherent gradient change of interlayer parameters is achieved.

In a preferred embodiment, the oxygen-containing organic group includes at least one of a hydroxyl group, an aldehyde group, a ketone group, a carboxyl group, or an ether group.

In this way, connection between the protective layer and the conductive layer of the original composite positive electrode current collector can be improved from intermolecular bonding to interatomic bonding, so that an interlayer bonding force can be significantly improved and the conductive layer can be prevented from falling off.

In a preferred embodiment, a thickness of the highly reduced graphene oxide is 0.5 nm to 7 nm, optionally 0.6 nm to 5 nm, and more optionally 0.7 nm to 3.5 nm.

In this way, coating, dispersibility in liquid as well as final thermal conductivity, electrical conductivity and hydrophobicity can be well balanced.

In a preferred embodiment, when the highly reduced graphene oxide is subjected to Raman detection, a characteristic peak D is observed at 1200 $cm^{-1}$ to 1400 $cm^{-1}$, a characteristic peak G is observed at 1500 $cm^{-1}$ to 1600 $cm^{-1}$, and a peak intensity ratio I(D)/I(G) of an intensity I(D) of the characteristic peak D to an intensity I(G) of the characteristic peak G is 1.2 or less.

In this way, coating, dispersibility in liquid as well as final thermal conductivity, electrical conductivity and hydrophobicity can be well balanced.

In a preferred embodiment, a contact angle of the highly reduced graphene oxide with respect to water is 90° or more.

In this way, coating, dispersibility in liquid as well as final thermal conductivity, electrical conductivity and hydrophobicity can be well balanced.

In a preferred embodiment, an electron mobility of the highly reduced graphene oxide at room temperature is $1 \times 10^4$ cm²/(V·s) to $1 \times 10^5$ cm²/(V·s).

In this way, good electrical conductivity can be obtained.

In a preferred embodiment, a thermal conductivity coefficient of the highly reduced graphene oxide is $2 \times 10^2$ W/(m·K) to $9 \times 10^4$ W/(m·K), optionally $8 \times 10^2$ W/(m·K) to $1 \times 10^4$ W/(m·K), and more optionally $2 \times 10^3$ W/(m·K) to $9 \times 10^3$ W/(m·K).

In this way, good thermal conductivity can be obtained.

In a preferred embodiment, a specific surface area of the highly reduced graphene oxide is 50 m²/g to 1000 m²/g, optionally 100 m²/g to 800 m²/g, and more optionally 140 m²/g to 700 m²/g.

In this way, a favorable adsorption force between the protective layer and the underlying insulation layer can be obtained.

In a preferred embodiment, fracture strength of the highly reduced graphene oxide is 20 GPa to 110 GPa, optionally 30 GPa to 100 GPa, and more optionally 40 GPa to 80 GPa.

In this way, good tensile strength of a composite material can be obtained. At the same time, the composite material has good toughness, can be bent, and has excellent ductility.

In a preferred embodiment, the metal oxide of the protective layer includes at least one of aluminum oxide, cobalt oxide, chromium oxide, or nickel oxide.

In a preferred embodiment, the conductive layer contains a metallic conductive material, and the metallic conductive material is selected from at least one of aluminum, copper, nickel, titanium, silver, nickel-copper alloy, or aluminum-zirconium alloy.

In a preferred embodiment, the insulation layer contains an organic polymer insulation material, and is selected from at least one of polyamide, polyethylene terephthalate, polyimide, polyethylene, polypropylene, polystyrene, polyvinyl chloride, acrylonitrile butadiene styrene copolymers, polybutylene terephthalate, poly-p-phenylene terephthamide, ethylene propylene copolymer, polyformaldehyde, epoxy resin, phenol-formaldehyde resin, polytetrafluoroethylene, polyvinylidene fluoride, silicon rubber, or polycarbonate.

In a preferred embodiment, the graphene metallization layer is formed by coating a slurry including the highly reduced graphene oxide and a binder in one or more methods of gravure coating, spraying and soaking, the binder includes one or more of glycidyl methacrylate, polyvinylidene fluoride, styrene-butadiene rubber latex, polytetrafluoroethylene, polyolefin, polyimide and polyurethane, and a solid content concentration of the slurry is 5% by weight to 30% by weight, and a proportion of the highly reduced graphene oxide in the solid content is 10% by weight to 35% by weight.

In this way, a graphene metallization layer having a good bonding force with the protective layer can be easily obtained.

In a further embodiment, there is provided an electrode plate, including the composite positive electrode current collector described above.

In this way, an electrode plate having a long cycle life can be obtained.

In a further embodiment, there is provided a secondary battery, including the electrode plate described above.

In this way, a secondary battery having a long cycle life can be obtained.

In a further embodiment, there is provided a battery module, including the secondary battery described above.

In this way, a battery module having a long cycle life can be obtained.

In a further embodiment, there is provided a battery pack, including the battery module described above.

In this way, a battery pack having a long cycle life can be obtained.

In a further embodiment, there is provided a power consumption apparatus, including at least one selected from the secondary battery, the battery module or the battery pack described above.

In this way, a power consumption apparatus having a long cycle life can be obtained.

Effects of the Disclosure

By having the above composition, the present disclosure can prevent or reduce damage or water absorption degradation of a protective layer caused by moisture in an electrolytic solution or air, improve a bonding force between layers in a composite positive electrode current collector, prevent a conductive layer from falling off, enhance mechanical strength of the composite positive electrode current collector and an electrode plate, and improve a cycle life of the current collector.

REFERENCE SIGN DESCRIPTION

1: Battery Module; 5: Secondary Battery; 51: Housing; 52: Electrode Assembly; 53: Top Cover Assembly; 101: Insulation Layer; 102: Protective Layer; 103: Graphene Metallization Layer; 104: Conductive Layer.

DESCRIPTION OF EMBODIMENTS

The present application is further described below with reference to specific embodiments. It should be understood that these embodiments are merely intended to illustrate the present application but not to limit the scope of the present application. It should be clear that the described embodiments are merely part of the embodiments of the present disclosure rather than all of the embodiments. All other embodiments obtained by those of ordinary skill in the art based on the embodiments of the present disclosure without paying creative labor shall fall within the protection scope of the present disclosure.

The structure and properties of a current collector according to an embodiment of the present application will be described in detail below.

Figure 1:
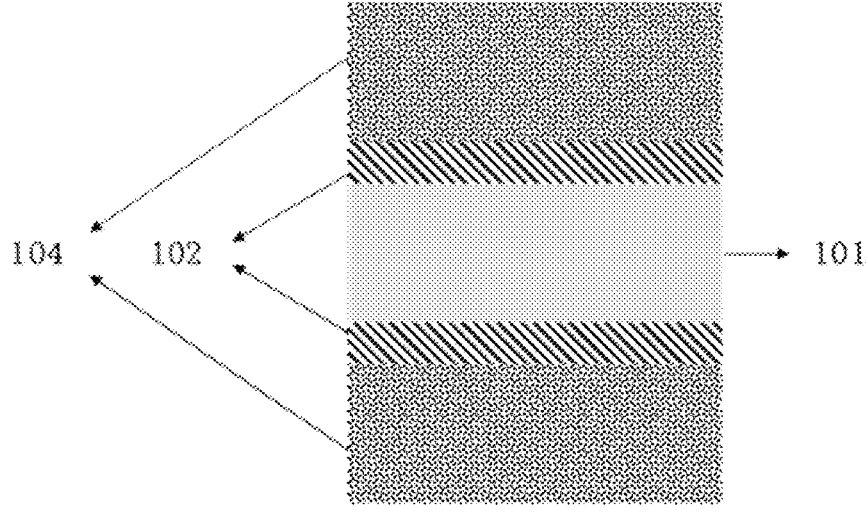
FIG. 1 is a schematic diagram of a layer structure of a composite positive electrode current collector in the related art.
Figure 2:
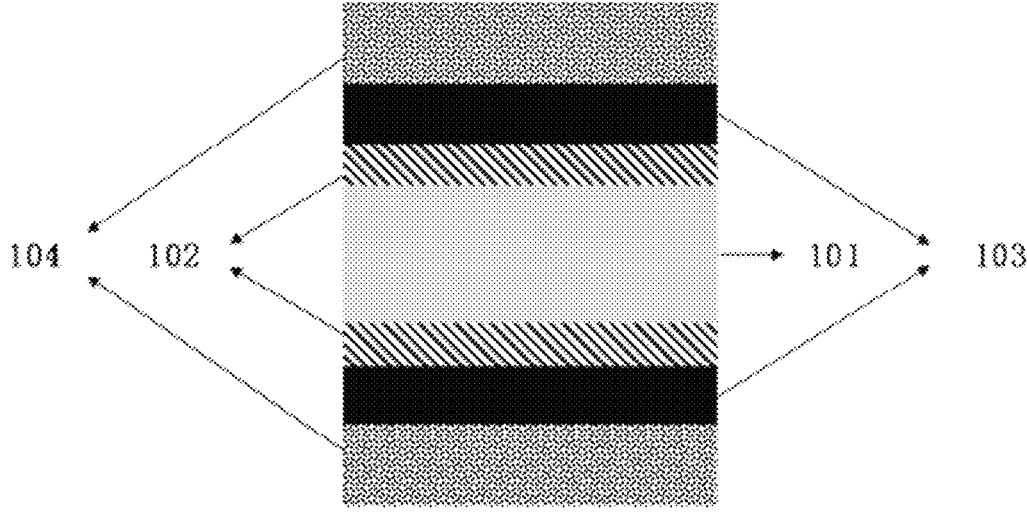
FIG. 2 is a structural schematic diagram of a composite positive electrode current collector according to an embodiment of the present application.
Figure 3:
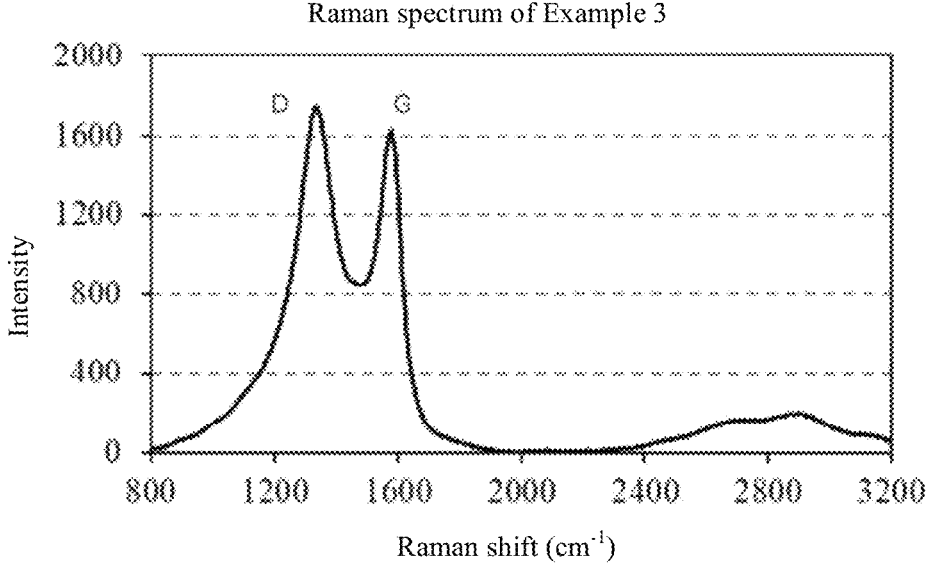
FIG. 3 is a Raman spectrum of highly reduced graphene oxide used in Example 03.
Figure 4:
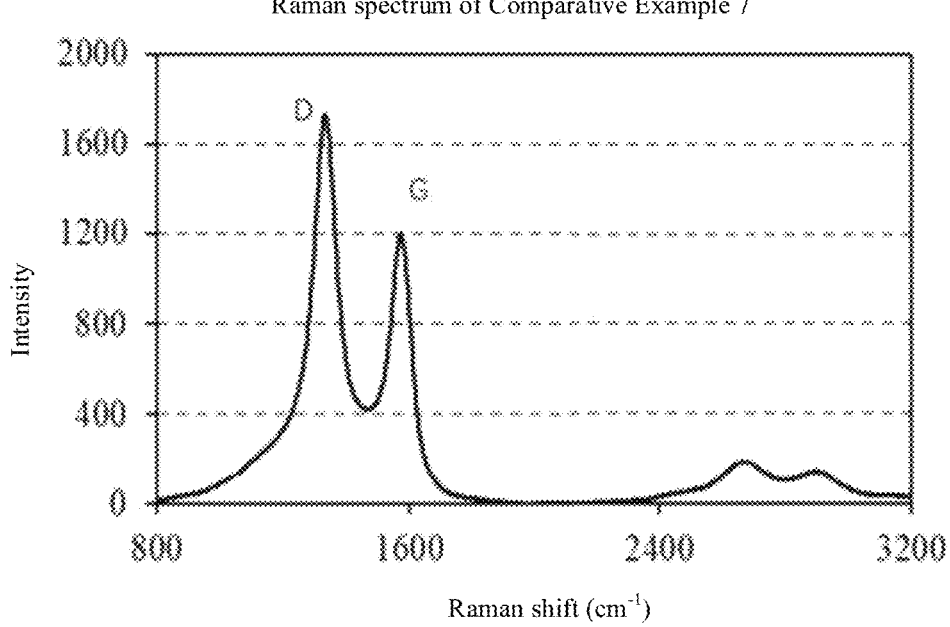
FIG. 4 is a Raman spectrum of graphene used in Comparative Example 7.
Figure 5:
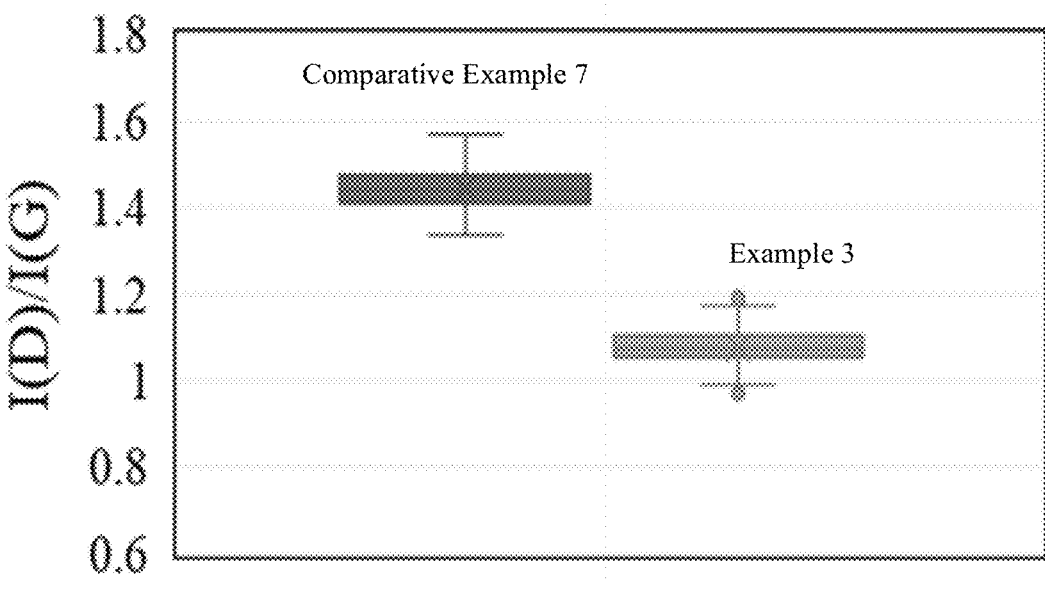
FIG. 5 shows I(D)/I(G) values of graphene used in Example 03 and Comparative Example 7.

In a composite positive electrode current collector of the present application, as shown in FIG. 2, on a surface of an insulation layer, a protective layer, a graphene metallization layer and a conductive layer are arranged in sequence; and the protective layer is composed of a metal oxide, and the graphene metallization layer contains highly reduced graphene oxide having an oxygen-containing organic group.

Each layer will be described in detail below.

[Graphene Metallization Layer]

In the current collector according to the embodiment of the present application, a graphene metallization layer is mainly used to support and protect the conductive layer. A thickness D2 of the graphene metallization layer only needs to enable the current collector to be used for the electrode plate, but preferably 1 nm≤D2≤200 nm. An upper limit of the thickness D2 may be 200 nm, 180 nm, 150 nm, 120 nm, 100 nm, 80 nm, 60 nm, 50 nm, 40 nm, 30 nm, or 20 nm. A lower limit of the thickness D2 may be 1 nm, 2 nm, 5 nm, 8 nm, 10 nm, 12 nm, 15 nm, or 18 nm. The thickness D2 may be in a range consisting of any one upper limit and any one lower limit. If the graphene metallization layer is too thin, it cannot fully enhance strength of the composite positive electrode current collector, and it is likely to be broken during a processing process of an electrode plate. If the graphene metallization layer is too thick, a volume energy density of a battery adopting this current collector can be reduced. Preferably, 5 nm≤D2≤150 nm; and more preferably, 10 nm≤D2≤100 nm.

By setting the graphene metallization layer between the protective layer and the conductive layer, the following effects can be exhibited.

Firstly, the graphene metallization layer contains the highly reduced graphene oxide that has the oxygen-containing organic group, and when the graphene metallization layer is used to connect the protective layer and the conductive layer, a bonding force between the latter two can be intensified. The mechanism is not clear, but it can be speculated that when the metal oxide in the protective layer and a metal material in the conductive layer are connected by the highly reduced graphene oxide containing the oxygen-containing organic group such as a hydroxyl group, an aldehyde group, a ketone group, a carboxyl group, and/or an ether group, a covalent bond such as —O—C—O-M can be formed (where M represents a metal atom), so that the connection between the protective layer and conductive layer of the original composite positive electrode current collector is improved from intermolecular bonding to interatomic bonding, which significantly improves an interlayer bonding force and prevents the conductive layer from falling off.

Moreover, by setting the graphene metallization layer, a continuous gradient change of physical parameters of the insulation layer, the protective layer, the graphene metallization layer and the conductive layer can be realized, so as to avoid a cliff-like physical parameter change such as direct transition of the insulation layer to the conductive layer, which achieves a continuous and uniformly distributed force between multi-layered structures of the composite positive electrode current collector, and realizes the firm bonding of interfaces of the composite positive electrode current collector during manufacturing and service processes.

Secondly, due to hydrophobicity of the highly reduced graphene oxide, penetration of an electrolytic solution into the protective layer can be inhibited, so that the protective layer can be inhibited from being corroded, and the conductive layer can be prevented from falling off.

Thirdly, due to high strength of the highly reduced graphene oxide, when cold-rolling is performed on an electrode plate produced by containing the highly reduced graphene oxide, the protective layer in the current collector is less likely to generate microcracks, and even when the electrolytic solution is infiltrated, a contact area between the electrolytic solution and the protective layer can also be reduced, which inhibits the corrosion of the protective layer and prevents the falling off of the conductive layer.

As regards the highly reduced graphene oxide, treated highly reduced graphene oxide is preferable. Accordingly, the highly reduced graphene oxide can be enabled to reach an appropriate degree of oxidation, which can better balance conductivity and the number of functional groups of materials, allocate the number of covalent bonds, and achieve a more coherent gradient change of interlayer parameters. The treated highly reduced graphene oxide is preferably graphene oxide that is subjected to oxidation, purification, drying and high-temperature reduction. The high-temperature reduction conditions are, for example, reduction treatment at 250° C. to 450° C. for 12 to 24 hours in the presence of a reducing agent.

The above reducing agent can use hydrazine and its derivatives for example.

As regards the treated highly reduced graphene oxide, highly reduced graphene oxide having two to six layers is preferable. When the number of layers is too large, the hydrophobicity is too strong, which will affect the coating and dispersion in liquid. When the number of layers is too small, thermal conductivity, electrical conductivity and final hydrophobicity cannot be sufficiently exerted.

As regards the highly reduced graphene oxide, a thickness is preferably in a range of 0.3 nm to 7 nm, preferably 0.5 nm to 5 nm, and more preferably 0.7 nm to 3.5 nm. Generally speaking, although the thickness of graphene has a certain relationship with the number of layers, they do not correspond exactly. This is considered to be due to differences in a degree of oxidation and functional groups of the graphene when the graphene is subjected to different treatments, which results in that intermolecular forces between layers are different or molecular shapes are different, and further the thickness and the number of layers do not correspond exactly. When the thickness is too large, the hydrophobicity is too strong, which will affect the coating and dispersion in liquid. When the thickness is too small, thermal conductivity, electrical conductivity and final hydrophobicity cannot be sufficiently exerted.

When the highly reduced graphene oxide is subjected to Raman detection, a characteristic peak D is observed at 1200 cm$^{-1}$ to 1400 cm$^{-1}$, a characteristic peak G is observed at 1500 cm$^{-1}$ to 1600 cm$^{-1}$, and a peak intensity ratio I(D)/I(G)

of an intensity I(D) of the characteristic peak D to an intensity I(G) of the characteristic peak G is preferably 1.2 or less, and more preferably less than 1.2. When the ratio is too high, it represents that carbon crystals have more defects, which will affect the property of the graphene material.

As regards the highly reduced graphene oxide, a contact angle thereof with respect to water is preferably 90° or more. If the contact angle is too small, the hydrophobicity is too low, which cannot ensure a sufficient effect of preventing the penetration of the electrolyte solution into microcracks.

As regards the highly reduced graphene oxide, an electron mobility thereof at room temperature is preferably $1 \times 10^4$ cm²/(V·s) to $1 \times 10^5$ cm²/(V·s). When the electron mobility is too low, the electrical conductivity of the composite current collector will be affected.

As regards the highly reduced graphene oxide, a thermal conductivity coefficient thereof is $2 \times 10^2$ W/(m·K) to $9 \times 10^4$ W/(m·K), optionally $8 \times 10^2$ W/(m·K) to $1 \times 10^4$ W/(m·K), and more optionally $2 \times 10^3$ W/(m·K) to $9 \times 10^3$ W/(m·K). When the thermal conductivity coefficient is too small, a heat conduction effect of the composite current collector will be affected.

As regards the highly reduced graphene oxide, a specific surface area thereof is 50 m²/g to 1000 m²/g, optionally 100 m²/g to 800 m²/g, and more optionally 140 m²/g to 700 m²/g. When the surface area is too large, the highly reduced graphene oxide is likely to agglomerate, which affects its dispersion effect in the liquid. When the surface area is too small, it is not conducive for an adsorption force between the protective layer and the underlying insulation layer.

As regards the highly reduced graphene oxide, fracture strength thereof is 20 GPa to 110 GPa, optionally 30 GPa to 100 GPa, and more optionally 40 GPa to 80 GPa. When the fracture strength is too high, overall toughness of the composite current collector is too strong, which results in a low elongation, and when the fracture strength is too low, an effect of enhancing tensile strength of the composite current collector cannot be achieved.

As regards a method of forming the graphene metallization layer on the protective layer, it can be exemplified that a slurry containing highly reduced graphene oxide and a binder is used to be coated on the protective layer in one or more methods of gravure coating, spray coating and immersion so as to form the graphene metallization layer.

The binder may be one or more of glycidyl methacrylate, polyvinylidene fluoride, styrene-butadiene rubber latex, polytetrafluoroethylene, polyolefin, polyimide and polyurethane, and a solid content concentration of the slurry may be 5% by weight to 30% by weight, and a proportion of the highly reduced graphene oxide in the solid content may be 10% by weight to 35% by weight.

[Insulation Layer]

In the current collector according to the embodiment of the present application, an insulation layer is mainly used to support and protect the conductive layer. A thickness D1 of the insulation layer only needs to enable the current collector to be used for an electrode plate, but preferably 1 μm≤D1≤20 μm. An upper limit of the thickness D1 may be 20 μm, 15 μm, 12 μm, 10 μm, or 8 μm. A lower limit of the thickness D1 may be 1 μm, 1.5 μm, 2 μm, 3 μm, 4 μm, 5 μm, 6 μm, or 7 μm. The thickness D1 is in a range consisting of any one upper limit and any one lower limit. If the insulation layer is too thin, it is likely to be broken during the processing process of the electrode plate. If the insulation layer is too thick, a volume energy density of the battery adopting this current collector can be reduced. Preferably, 2 μm≤D1≤10 μm, and more preferably, 2 μm≤D1≤6 μm.

Optionally, the insulation layer is made of a material selected from one of organic polymer insulation material, inorganic insulation material, and composite material. Further preferably, the composite material consists of organic polymer insulation material and inorganic insulation material.

The organic polymer insulation material is selected from at least one of polyamide (PA), polyethylene terephthalate (PET), polyimide (PI), polyethylene (PE), polypropylene (PP), polystyrene (PS), polyvinyl chloride (PVC), acrylonitrile butadiene styrene copolymers (ABS), polybutylene terephthalate (PBT), poly-p-phenylene terephthamide (PPA), epoxy resin, poly polyformaldehyde (POM), phenol-formaldehyde resin, ethylene propylene copolymer (PPE), polytetrafluoroethylene (PTFE), silicon rubber, polyvinylidene fluoride (PVDF), or polycarbonate (PC).

The organic polymer insulation material is preferably selected from at least one of $Al_2O_3$, SiC, or $SiO_2$.

The composite material is preferably selected from at least one of epoxy resin glass fiber reinforced composite material and polyester resin glass fiber reinforced composite material.

Preferably, a material of the insulation layer is selected from the organic polymer insulation material. Since the insulation layer usually has a smaller density than the metal, the composite positive electrode current collector according to the present application can improve the weight energy density of the battery. In addition, since the insulation layer can well support and protect the layers located on the surface thereof, a breakage of the electrode plate, which is common in the conventional current collector, is unlikely to occur.

[Protective Layer]

The current collector according to the present application includes a protective layer arranged between the insulation layer and the graphene metallization layer.

The protective layer according to the present application can form a supporting structure to protect the insulation layer, thereby better protecting the insulation layer, and preventing the insulation layer from being oxidized, corroded or damaged. In addition, the protective layer according to the present application can also intensify the bonding force between the insulation layer and the graphene metallization layer, thereby improving mechanical strength of the current collector.

A material of the protective layer is a metal oxide. The metal oxide is preferably at least one of aluminum oxide, cobalt oxide, chromium oxide, or nickel oxide.

Since the metal oxide has a greater specific surface area, the bonding force between the protective layer made of the metal oxide material and the insulation layer is enhanced. Meanwhile, since the specific surface area of the metal oxide is greater, the bonding force between the graphene metallization layer and the insulation layer can be enhanced, thereby increasing the overall strength of the current collector.

A thickness D3 of the protective layer needs to enable the current collector to be used for the electrode plate, but preferably D3≤1/10 D4 and 1 nm≤D3≤200 nm. That is, the thickness D3 is smaller than or equal to 1/10 of the thickness D4 of the conductive layer and is in a range of 1 nm to 200 nm. An upper limit of the thickness D3 of the protective layer may be 200 nm, 180 nm, 150 nm, 120 nm, 100 nm, 80 nm, 60 nm, 55 nm, 50 nm, 45 nm, 40 nm, 30 nm, or 20 nm. A lower limit of the thickness D3 of the protective layer may be 1 nm, 2 nm, 5 nm, 8 nm, 10 nm, 12 nm, 15 nm, or 18 nm.

The thickness D3 of the protective layer is in a range consisting of any one upper limit and any one lower limit. If the protective layer is too thin, it is not enough to protect the insulation layer; and if the protective layer is too thick, it has a limited effect on improving the mechanical strength or the safety of the current collector, etc., but may reduce the weight energy density and volume energy density of the battery. Preferably, 10 nm≤D3≤50 nm, and 10 nm≤D3≤50 nm.

The protective layer can be formed on the insulation layer by means of sputtering, an in-situ formation method, a coating method, or the like. The sputtering is preferably magnetron sputtering. The in-situ formation method is preferably an in-situ passivation method, i.e., a method for in-situ forming a metal oxide passivation layer on a metal surface. The coating method is preferably one of roll coating, extrusion coating, blade coating, gravure coating, and the like.

[Conductive Layer]

In the current collector according to the embodiment of the present application, a thickness D4 of a conductive layer only needs to enable the current collector to be used for the electrode plate, but preferably 300 nm≤D4≤2 μm.

A material of the conductive layer is a metallic conductive material, and the metallic conductive material is preferably selected from at least one of aluminum, copper, nickel, titanium, silver, nickel-copper alloy, or aluminum-zirconium alloy.

In the embodiment of the present application, the conductive layer has the thickness D4 which is sufficient to have effects of conduction and current collection. Preferably, an upper limit of the thickness D4 may be 2 μm, 1.8 μm, 1.5 μm, 1.2 μm, or 900 nm, and a lower limit of the thickness D4 of the conductive layer may be 800 nm, 700 nm, 600 nm, 500 nm, 450 nm, 400 nm, 350 nm, or 300 nm. The thickness D4 of the conductive layer is in a range consisting of any one upper limit and any one lower limit. If the thickness of the conductive layer is too small, the effects of conduction and current collection are too poor, the polarization of the battery can be severe, and the conductive layer is also likely to be damaged during the processing process of the electrode plate. If the thickness of the conductive layer is too large, a weight energy density of the battery can be affected, and the resistance of the current collector can be reduced, which is not conducive to improving the safety performance of the battery. Preferably, 500 nm≤D4≤1.5 μm.

The conductive layer can formed on the graphene metallization layer by means of at least one of mechanical rolling, bonding, vapor deposition, and electroless plating. With respect to the vapor deposition, physical vapor deposition (PVD) is preferable. Preferably, the physical vapor deposition is at least one of evaporation deposition and sputtering deposition. As regards the evaporation deposition, at least one of vacuum evaporation, thermal evaporation deposition, and electron beam evaporation method (EBEM) is preferable. As regards the sputtering deposition, magnetron sputtering is preferable.

Another embodiment of the present disclosure is a positive electrode plate using the above composite positive electrode current collector. The structure and properties of the positive electrode plate are described in detail below.

The positive electrode plate includes the above composite positive electrode current collector and a positive electrode film layer containing a positive active material disposed on at least one surface of the composite positive electrode current collector.

The positive active material may adopt a positive active material for a battery known in the art. As an example, the positive active material may include at least one of the following materials: a lithium-containing phosphate of an olivine structure, a lithium transition metal oxide, and their respective modified compounds. However, the present application is not limited to these materials, and other conventional materials that may be used as the positive active material for the battery may also be used. These positive active materials may be used alone, or two or more types may be used in combination. Examples of the lithium transition metal oxide may include but are not limited to at least one of a lithium cobalt oxide (such as $LiCoO_2$), a lithium nickel oxide (such as $LiNiO_2$), a lithium manganese oxide (such as $LiMnO_2$ and $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$), a lithium nickel cobalt aluminum oxide (such as $LiNi_{0.85}Co_{0.15}Al_{0.05}O_2$), or modified compounds thereof. Examples of the lithium-containing phosphate of the olivine structure may include, but are not limited to, at least one of lithium iron phosphate (such as $LiFePO_4$ (also referred to as LFP)), a composite material of lithium iron phosphate and carbon, lithium manganese phosphate (such as $LiMnPO_4$), a composite material of lithium manganese phosphate and carbon, lithium iron manganese phosphate, or a composite material of lithium iron manganese phosphate and carbon.

The positive electrode film layer also optionally includes a binder and a conductive agent.

The positive electrode plate can be prepared in the following manner: the above-mentioned components for preparing the positive electrode plate, such as the positive active material, the conductive agent, the binder and any other components, are dispersed in a solvent (such as N-methylpyrrolidone) to form a positive electrode slurry; the positive electrode slurry is coated on the above composite positive electrode current collector; and after drying, cold pressing and other processes, a positive electrode plate is thus obtained.

Another embodiment of the present disclosure is a secondary battery using the above positive electrode plate. The structure and properties of the secondary battery are described in detail below. Typically, a secondary battery includes a positive electrode plate, a negative electrode plate, an electrolyte, and a separator.

[Negative Electrode Plate]

A negative electrode plate includes a negative electrode current collector and a negative electrode film layer disposed on at least one surface of the negative electrode current collector, and the negative electrode film layer includes a negative active material. The negative electrode film layer is disposed on a surface of the negative electrode current collector.

The negative electrode current collector may adopt metal foil or a composite current collector. For example, as regards the metal foil, copper foil can be used. The composite current collector may include a polymer material base layer and a metal layer formed on at least surface of the polymer material substrate. The composite current collector may be formed by synthesizing a metal material (copper, copper alloy, nickel, nickel alloy, titanium, titanium alloy, silver and silver alloy, or the like) on the polymer material substrate (such as a substrate of polypropylene (PP), polyethylene terephthalate (PET), polybutylene terephthalate (PBT), polystyrene (PS), polyethylene (PE), or the like).

The negative active material may adopt a negative active material for a battery known in the art. As an example, the negative active material may include at least one of the following materials: artificial graphite, natural graphite, soft carbon, hard carbon, silicon-based material, tin-based material, lithium titanate, and the like. However, the present application is not limited to these materials, and another conventional material that may be used as the negative active material for the battery may also be used. These negative active materials may be used alone, or two or more types may be used in combination.

The negative electrode film layer also optionally includes a binder, a conductive agent and other auxiliary agents.

The negative electrode plate can be prepared in the following manner: the above-mentioned components for preparing the negative electrode plate, such as the negative active material, the conductive agent, the binder and any other components, are dispersed in a solvent (such as deionized water) to form a negative electrode slurry; the negative electrode slurry is coated on the negative electrode current collector; and after drying, cold pressing and other processes, the negative electrode plate is thus obtained.

[Electrolyte]

An electrolyte plays the role of conducting ions between the positive electrode plate and the negative electrode plate. There is no specific limitation on the type of the electrolyte in the present application, which can be selected according to requirements. For example, the electrolyte may be liquid, gel or all solid.

[Separator]

A separator is further included in the secondary battery. There is no specific limitation on the type of the separator in the present application, and any known separator in a porous structure with good chemical stability and mechanical stability can be selected.

A material of the separator may be selected from at least one of glass fiber, non-woven fabric, polyethylene, polypropylene or polyvinylidene fluoride. The separator may be a single-layered thin film or a multi-layered composite thin film, which is not particularly limited. When the separator is a multi-layered composite thin film, materials of layers may be the same or different, and are not particularly limited.

The positive electrode plate, the negative electrode plate and the separator can be made into an electrode assembly by a winding process or a lamination process.

The secondary battery may include an outer package. The outer package may be used to package the above electrode assembly and electrolyte. The outer package of the secondary battery may be a hard shell or a soft package.

Figure 6:
FIG. 6 is a schematic diagram of a secondary battery according to an embodiment of the present application.
Figure 6:
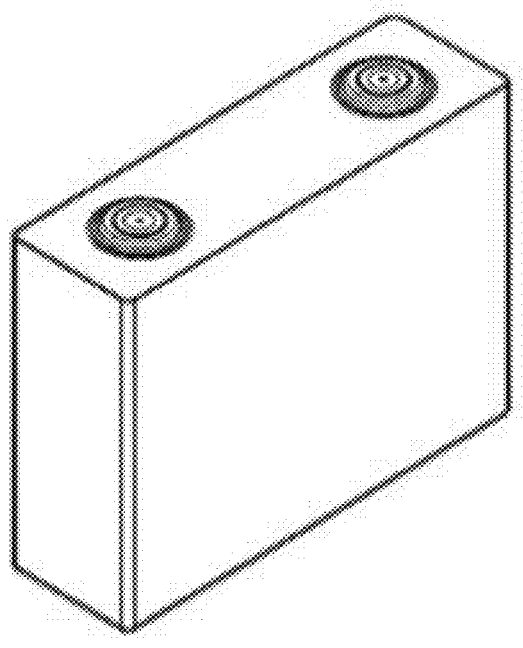

The present application has no particular limitation on the shape of the secondary battery, and the secondary battery may be cylindrical, square, or in any other shape. For example, FIG. 6 is a secondary battery 5 in a square structure as an example.

Figure 7:
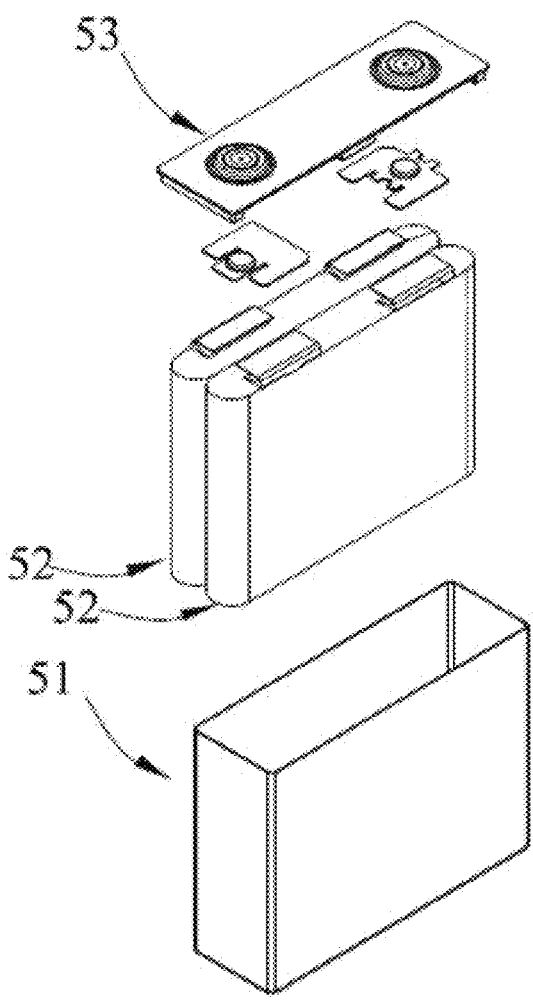
FIG. 7 is an exploded view of the secondary battery according to the embodiment of the present application shown in FIG. 6.

Referring to FIG. 7, the outer package may include a housing 51 and a cover plate 53. The housing 51 may include a bottom plate and side plates connected to the bottom plate, and the bottom plate and the side plates are enclosed to form an accommodating cavity. The housing 51 has an opening that is in communication with the accommodating cavity, and the cover plate 53 can cover the opening to close the accommodating cavity. A positive electrode plate, a negative electrode plate and a separator may form an electrode assembly 52 through a winding process or a lamination process. The electrode assembly 52 is packaged in the accommodating cavity. An electrolytic solution is infiltrated in the electrode assembly 52. The number of electrode assemblies 52 included in the secondary battery 5 may be one or more, and those skilled in the art may make an option specifically according to actual needs.

Another embodiment of the present disclosure is a battery module assembled by assembling at least one secondary battery 5. The specific number of secondary batteries 5 contained in the battery module may be selected according to the application and capacity of the battery module.

Another embodiment of the present disclosure is a battery pack using the above battery module, which is a battery pack obtained by assembling the above one or more battery modules.

Another embodiment of the present disclosure is a power consumption apparatus using the above secondary battery, battery module, or battery pack.

The above power consumption apparatus includes the secondary battery, the battery module or the battery pack of the present application. The above secondary battery, battery module or battery pack may be used as a power supply of the above power consumption apparatus, and may also be used as an energy storage unit of the above power consumption apparatus. The above power consumption apparatus may include a mobile device (such as a mobile phone, a laptop, etc.), an electric vehicle (such as a pure electric vehicle, a hybrid electric vehicle, a plug-in hybrid electric vehicle, an electric bicycle, an electric scooter, an electric golf cart, an electric truck, etc.), an electric train, a ship and satellite, an energy storage system, or the like, but is not limited thereto.

As regards the above power consumption apparatus, the secondary battery, the battery module, or the battery pack may be selected according to usage requirements.

Figure 8:
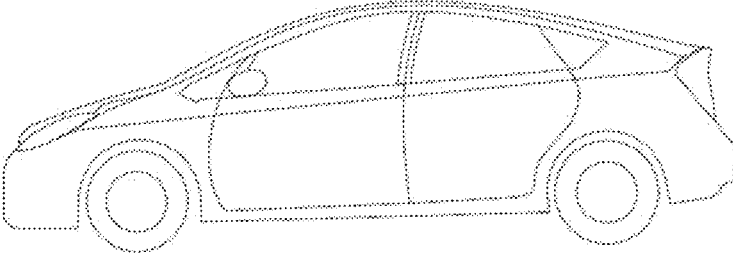
FIG. 8 is a schematic diagram of a power consumption apparatus using a battery pack in an embodiment of the present application as a power supply.

FIG. 8 is a power consumption apparatus as an example. The power consumption apparatus is a full electric vehicle, a hybrid electric vehicle, a plug-in hybrid electric vehicle, or the like. In order to meet the requirement of the power consumption apparatus for battery life at low temperature, the secondary battery, the battery module or the battery pack of the present application can be adopted.

In a composite positive electrode current collector, an electrode plate, a secondary battery, a battery module, a battery pack and a power consumption apparatus according to the present disclosure, since a graphene metallization layer is arranged between a protective layer and a conductive layer in the composite positive electrode current collector, a bonding force of various layers in the composite positive electrode current collector is enhanced, and thus the respective cycle life can be improved.

Embodiments

Hereinafter, the present disclosure will be described with reference to embodiments.

1. Preparation of Composite Positive Electrode Current Collector:

For a composite positive electrode current collector of the present disclosure, various layers are formed in the following manner. Various parameters of the composite positive electrode current collector obtained are shown in Table 1 below.

1.1 Formation of Protective Layer

A protective layer can be formed on a conventional insulation layer by means of vapor deposition, an in-situ formation method, a coating method, or the like. With respect to the vapor deposition, physical vapor deposition

13

(PVD) is preferable. The physical vapor deposition is preferably at least one of evaporation deposition and sputtering deposition. The evaporation deposition is preferably at least one of vacuum evaporating, thermal evaporation deposition, and electron beam evaporation method (EBEM). As regards the sputtering deposition, magnetron sputtering is preferable. The in-situ formation method is preferably an in-situ passivation method, i.e., a method for in-situ forming a metal oxide passivation layer on a surface. The coating method is preferably one of roll coating, extrusion coating, blade coating, gravure coating, and the like.

1.2 Formation of Graphene Metallization Layer

On a protective layer or an insulation layer, a slurry containing highly reduced graphene oxide and a binder is first coated by gravure coating, spraying or soaking, and then dried, so as to form a graphene metallization layer on a surface of the protective layer or the insulation layer.

Formation conditions of the coating method are as follows: the highly reduced graphene oxide, the binder and NMP are stirred and mixed, and then a surface of a sample is coated with the above slurry including the highly reduced graphene oxide and the binder (glycidyl methacrylate) (a solid content concentration is 5% by weight to 30% by weight, and a proportion of the highly reduced graphene oxide in the solid content is 10% by weight to 35% by weight), and then coating is carried out by using a gravure roll, spray gun or soaking method to control a coating thickness, and finally drying is conducted at 60° C. to 120° C. The graphene metallization layer is thus obtained. Conditions such as the specific solid content concentration in the slurry and the drying temperature can be appropriately adjusted according to viscosity required by the coating method.

1.3 Formation of Conductive Layer

A conductive layer can be formed on the graphene metallization layer or the protective layer by means of at least one of mechanical rolling, bonding, vapor deposition, and electroless plating. With respect to the vapor deposition, physical vapor deposition (PVD) is preferable. Preferably, the physical vapor deposition is at least one of evaporation deposition and sputtering deposition. As regards the evaporation deposition, at least one of vacuum evaporation, thermal evaporation deposition, and electron beam evaporation method (EBEM) is preferable. As regards the sputtering deposition, magnetron sputtering is preferable.

TABLE 1

| | | | | | Graphene metallization layer | | | | |
| | | | | | Graphene | | | | |
| Composite current collector | Insulation layer | | Protective layer | | | Graphene | | | Contact angle with |
| | Material | Thickness (μm) | Material | Thickness (μm) | Type | Layer number | thickness (nm) | $I(D)/I(G)$ | respect to water (°) |
|---|---|---|---|---|---|---|---|---|---|
| A | PET | 6 | Aluminum | 30 | Highly | 2 | 0.9 | 0.76 | 93 |
| B | | | oxide | | reduced | 3 | 1.4 | 0.84 | 98 |
| C | | | | | graphene | 4 | 2.0 | 0.95 | 100 |
| D | | | | | oxide | 5 | 2.5 | 1.06 | 105 |
| E | | | | | | 6 | 3.3 | 1.18 | 116 |
| F | | | | | | 4 | 2.0 | 0.95 | 100 |
| G | | | | | | 4 | 2.0 | 0.95 | 100 |
| H | | | | | | 4 | 2.0 | 0.95 | 100 |
| I | | | | | | 4 | 2.0 | 0.95 | 100 |
| J | | | | | | 4 | 2.0 | 0.95 | 100 |
| K | | | | | | 4 | 2.0 | 0.95 | 100 |
| L | | | | | | 4 | 2.0 | 0.95 | 100 |
| M | | | | | | 4 | 2.0 | 0.95 | 100 |
| N | | | | | | 4 | 2.0 | 0.95 | 100 |
| O | | | | | | 4 | 2.0 | 0.95 | 100 |
| P | | | | | | 4 | 2.0 | 0.95 | 100 |
| Q | | | | | | 4 | 2.0 | 0.95 | 100 |
| R | | | Nickel oxide | 30 | | 4 | 2.0 | 0.95 | 100 |
| S | | | Aluminum | 30 | | 4 | 2.0 | 0.95 | 100 |
| T | PA | 6 | oxide | | | 4 | 2.0 | 0.95 | 100 |
| U | SiC | | | | | 4 | 2.0 | 0.95 | 100 |
| a | PET | 6 | — | 0 | Highly | 2~6 | 0.9 | 0.76 | 93 |
| b | | | | | reduced | 2~6 | 2.0 | 0.95 | 100 |
| c | | | | | graphene | 2~6 | 3.3 | 1.18 | 116 |
| d | | | | 30 | oxide | 1 | 0.35 | 0.88 | 82 |
| e | | | | | | 8 | 4.0 | 1.25 | 120 |
| f | | | | | | 10 | 5.2 | 1.40 | 135 |
| g | | | | | Graphene | 2~6 | 1.9 | 1.88 | 57 |
| h | | | | | oxide/ conventional graphene | 2~6 | 2.3 | 0.69 | 146 |
| i | | | | | — | | | | |

TABLE 1-continued

| | Graphene metallization layer | | | | | | | |
| | Graphene | | | | Proportion of the highly | | | |
| Composite current collector | Electron mobility ($cm^2/(V \cdot s)$) | Specific surface area ($m^2/g$) | Fracture strength (Gpa) | Solid content concentration (% by weight) | reduced graphene oxide in the solid content (% by weight) | Layer thickness (nm) | Conductive layer Material | Thickness (nm) |
|---|---|---|---|---|---|---|---|---|
| A | 8.0E+04 | 689 | 98 | 15 | 20 | 150 | Al | 700 |
| B | 6.7E+04 | 557 | 75 | 15 | 20 | 150 | | |
| C | 4.9E+04 | 480 | 66 | 15 | 20 | 150 | | |
| D | 3.3E+04 | 336 | 50 | 15 | 20 | 150 | | |
| E | 2.1E+04 | 232 | 43 | 15 | 20 | 150 | | |
| F | 4.9E+04 | 480 | 66 | 5 | 20 | 150 | | |
| G | 4.9E+04 | 480 | 66 | 10 | 20 | 150 | | |
| H | 4.9E+04 | 480 | 66 | 20 | 20 | 150 | | |
| I | 4.9E+04 | 480 | 66 | 25 | 20 | 150 | | |
| J | 4.9E+04 | 480 | 66 | 30 | 20 | 150 | | |
| K | 4.9E+04 | 480 | 66 | 35 | 20 | 150 | | |
| L | 4.9E+04 | 480 | 66 | 15 | 5 | 150 | | |
| M | 4.9E+04 | 480 | 66 | 15 | 10 | 150 | | |
| N | 4.9E+04 | 480 | 66 | 15 | 20 | 150 | | |
| O | 4.9E+04 | 480 | 66 | 15 | 25 | 150 | | |
| P | 4.9E+04 | 480 | 66 | 15 | 30 | 150 | | |
| Q | 4.9E+04 | 480 | 66 | 15 | 35 | 150 | | |
| R | 4.9E+04 | 480 | 66 | 15 | 20 | 150 | | |
| S | 4.9E+04 | 480 | 66 | 15 | 20 | 150 | Cu | 700 |
| T | 4.9E+04 | 480 | 66 | 15 | 20 | 150 | Al | 700 |
| U | 4.9E+04 | 480 | 66 | 15 | 20 | 150 | | |
| a | 8.0E+04 | 689 | 98 | 15 | 20 | 150 | Al | 700 |
| b | 4.9E+04 | 480 | 66 | 15 | 20 | 150 | | |
| c | 2.1E+04 | 232 | 43 | 15 | 20 | 150 | | |
| d | 1.5E+05 | 2033 | 120 | 15 | 20 | 150 | | |
| e | 1.7E+04 | 198 | 34 | 15 | 20 | 150 | | |
| f | 1.1E+04 | 173 | 30 | 15 | 20 | 150 | | |
| g | 6.5E+03 | 53 | 7 | 15 | 20 | 150 | | |
| h | 5.2E+04 | 1300 | 103 | 15 | 20 | 150 | | |
| i | | | | | | | | |

Specific parameters of the obtained current collector having the graphene metallization layer are shown in Table 1. A thickness of each layer is measured by a scanning electron microscope (SEM) method, measurement conditions are conventional detection, and magnification factor is 30K. The number of layers of the highly reduced graphene oxide is measured by a Raman detection method, a measurement condition is 532 nm laser detection, and a test wave number range is 800-3200; a calculation method of I(D)/I(G) is directly using peak intensities to calculate a ratio thereof according to intensities of a D peak and a G peak obtained by the Raman detection; a contact angle with respect to water is measured by a video optical contact angle measurement method based on sessile drop analysis, and the measurement is carried out with reference to the national standard GB/T 30693-2014; an electron mobility is measured by a Hall effect method, and the measurement is carried out with reference to the standard Q/GZSPEI 30201100224-2018; a specific surface area is measured by a gas adsorption BET method to measure a specific surface area of solid substances, and the measurement is carried out with reference to the national standard GB/T 19587-2017; fracture strength is measured by a tensile strength test method, and measurement conditions are: a tensile speed is 50 mm/min; a bonding force is measured by a tensile strength test method, and the measurement is carried out with reference to the national standard GB/T 13542.2-2009; a water content is measured by a Karl Fischer liquid moisture test method, and the measurement is carried out with reference to the standard HG/T 4067-2015; and a solid content concentration in a slurry is calculated based on mass of each composition used to make the slurry.

It can be seen from the above table that a composite current collector numbered C including a graphene metallization layer has the best comprehensive properties such as tensile strength, elongation, bonding force and water content of a protective layer after 15 days.

TABLE 2

| | Composite current collector sample | Tensile strength (Mpa) | Tensile modulus (Mpa) | Elongation (%) | Bonding force (N) | Water content of a protective layer after 15 days (ppm) |
|---|---|---|---|---|---|---|
| Example | A | 296 | 8977 | 4.1 | 4.9 | 945 |
| | B | 293 | 8863 | 4.2 | 5.1 | 879 |

TABLE 2-continued

| Composite current collector sample | | Tensile strength (Mpa) | Tensile modulus (Mpa) | Elongation (%) | Bonding force (N) | Water content of a protective layer after 15 days (ppm) |
|---|---|---|---|---|---|---|
| | C | 296 | 9002 | 4.3 | 5.2 | 809 |
| | D | 292 | 8176 | 4.3 | 5.2 | 726 |
| | E | 294 | 8921 | 4.2 | 5 | 638 |
| | F | 270 | 6903 | 3.0 | 4.4 | 2178 |
| | G | 275 | 7355 | 3.5 | 4.6 | 1644 |
| | H | 277 | 7289 | 3.2 | 4.7 | 1601 |
| | I | 273 | 6888 | 3.3 | 4.4 | 2258 |
| | J | 269 | 6794 | 3.1 | 4.2 | 2359 |
| | K | 264 | 6710 | 2.9 | 4.2 | 2416 |
| | L | 230 | 5580 | 3.5 | 3.5 | 4098 |
| | M | 257 | 5829 | 3.7 | 3.9 | 3270 |
| | N | 262 | 6702 | 3.7 | 4.1 | 2785 |
| | O | 252 | 5750 | 3.4 | 3.8 | 2905 |
| | P | 245 | 5677 | 3.2 | 3.7 | 3066 |
| | Q | 233 | 5597 | 3.0 | 3.5 | 3209 |
| | R | 269 | 6954 | 3.1 | 3.9 | 2202 |
| | S | 251 | 5789 | 3.2 | 2.1 | 1727 |
| | T | 180 | 2711 | 2.4 | 2.5 | 1855 |
| | U | 670 | 12105 | 0.9 | 1.9 | 2330 |
| Comparative Example | a | 296 | 8968 | 3.5 | 3.3 | 945 |
| | b | 296 | 9013 | 3.8 | 3.6 | 809 |
| | c | 294 | 8933 | 3.2 | 3.2 | 638 |
| | d | 295 | 8999 | 4.3 | 4.5 | 2205 |
| | e | 293 | 8788 | 4.2 | 4.4 | 1338 |
| | f | 289 | 8659 | 4.2 | 4.2 | 1857 |
| | g | 228 | 4485 | 3.6 | 4.3 | 5033 |
| | h | 234 | 5642 | 4.1 | 3.2 | 744 |
| | i | 220 | 4059 | 3.5 | 3.3 | 4347 |

As can be seen from the above table, compared with a composite current collector numbered g (Comparative Example 7), a composite current collector numbered C (Example 03) including a graphene metallization layer has significantly improved properties, for example, tensile strength, elongation and water content of a protective layer after 15 days.

1.4 Formation of Secondary Battery

Using a positive tab shown in the above table, a secondary battery is produced by the following method.

Preparation of Battery:

According to a conventional battery preparing process, a positive electrode plate (compacted density: 3.4 g/cm³), a PP/PE/PP separator and a negative electrode plate (compacted density: 1.6 g/cm³) together are winded to form a bare cell, then the bare cell is placed into a battery housing, an electrolytic solution (EC: EMC in a volume ratio of 3:7, LiPF₆: 1 mol/L) is injected into the housing, followed by sealing, formation, and the like, so as to obtain a lithium-ion secondary battery.

Cycle characteristics of the obtained secondary battery are measured, and results are shown in Table 3 below.

Test Method of Battery:

A method for testing cycle life of the lithium-ion battery was performed as follows:

A lithium-ion battery was charged and discharged at 25° C. and 45° C., respectively, i.e., the battery was firstly charged with a current of 1C to a voltage of 4.2V, then was discharged with a current of 1C to a voltage of 2.8V, and a discharge capacity after a first cycle was recorded; and the battery was charged and discharged with a current of 1C/1C for 1000 cycles as above, and a discharge capacity of the battery after a 1000th cycle was recorded. A capacity retention rate after the 1000th cycle was obtained by dividing the discharge capacity after the 1000th cycle by the discharge capacity after the first cycle.

TABLE 3

| | Battery sample number | Composite current collector sample | 80% battery cycle times | Retention rate after 1000 cycles |
|---|---|---|---|---|
| Example | 01 | A | 2217 | 90.3% |
| | 02 | B | 2265 | 90.6% |
| | 03 | C | 2290 | 91.0% |
| | 04 | D | 2258 | 90.5% |
| | 05 | E | 2250 | 90.4% |
| | 06 | F | 2099 | 89.2% |
| | 07 | G | 2130 | 89.4% |
| | 08 | H | 2135 | 89.8% |
| | 09 | I | 2117 | 89.3% |
| | 10 | J | 2003 | 88.8% |
| | 11 | K | 1978 | 88.6% |
| | 12 | L | 1935 | 87.7% |
| | 13 | M | 1943 | 87.9% |
| | 14 | N | 1964 | 88.4% |
| | 15 | O | 1955 | 88.2% |
| | 16 | P | 1948 | 88.0% |
| | 17 | Q | 1938 | 87.8% |
| | 18 | R | 2109 | 89.0% |
| | 19 | S | 1458 | 84.2% |
| | 20 | T | 1562 | 85.4% |
| | 21 | U | 1400 | 84.0% |
| Comparative Example 3 | 1 | a) | 2185 | 90.1% |
| | 2 | b | 2270 | 90.9% |
| | 3 | c | 2255 | 90.4% |
| | 4 | d | 2122 | 89.7% |
| | 5 | e | 2054 | 89.1% |
| | 6 | f | 1999 | 88.8% |
| | 7 | g | 1735 | 86.9% |

19

TABLE 3-continued

| Battery sample number | Composite current collector sample | 80% battery cycle times | Retention rate after 1000 cycles |
|---|---|---|---|
| 8 | h | 2241 | 90.0% |
| 9 | i | 1842 | 87.2% |

As can be seen from the above Table 2 and Table 3, compared with the prior art, an embodiment of the present disclosure includes arranging a graphene metallization layer between a protective layer and a conductive layer, so that physical properties of an electrode plate are improved, and cracks and microcracks generated after cold rolling and cycling are reduced. Further, when the electrode plate using a current collector of the present disclosure is used in a battery, characteristics of a battery are effectively improved, and a cycle life of the battery is significantly improved.

Figure 9:
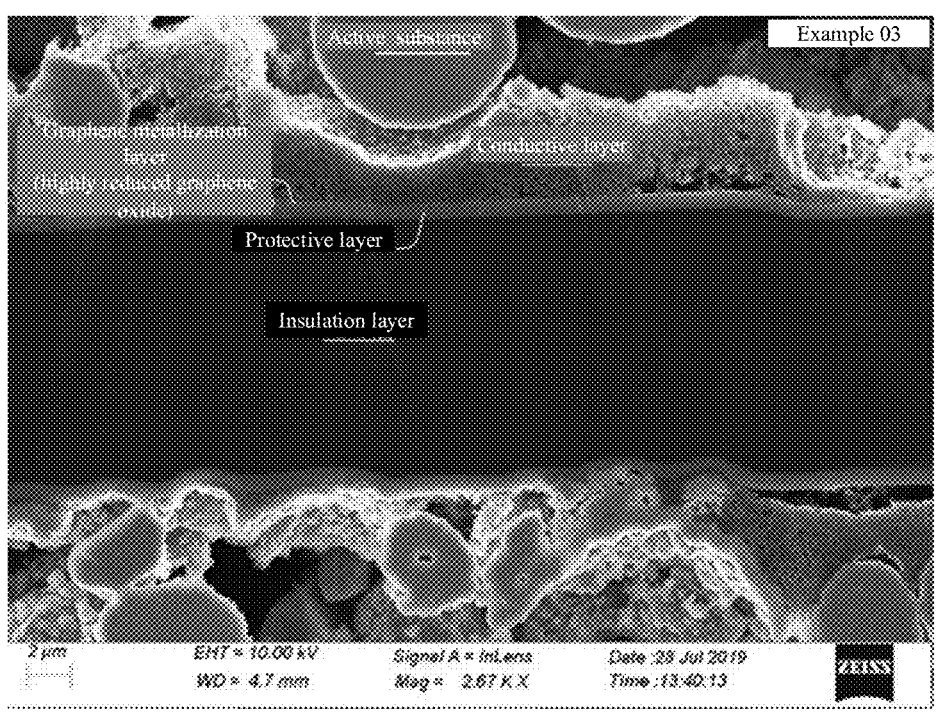
FIG. 9 is a cross-sectional SEM photograph of a composite positive electrode current collector used in Example 03 after 1000 times of charging and discharging.
Figure 10:
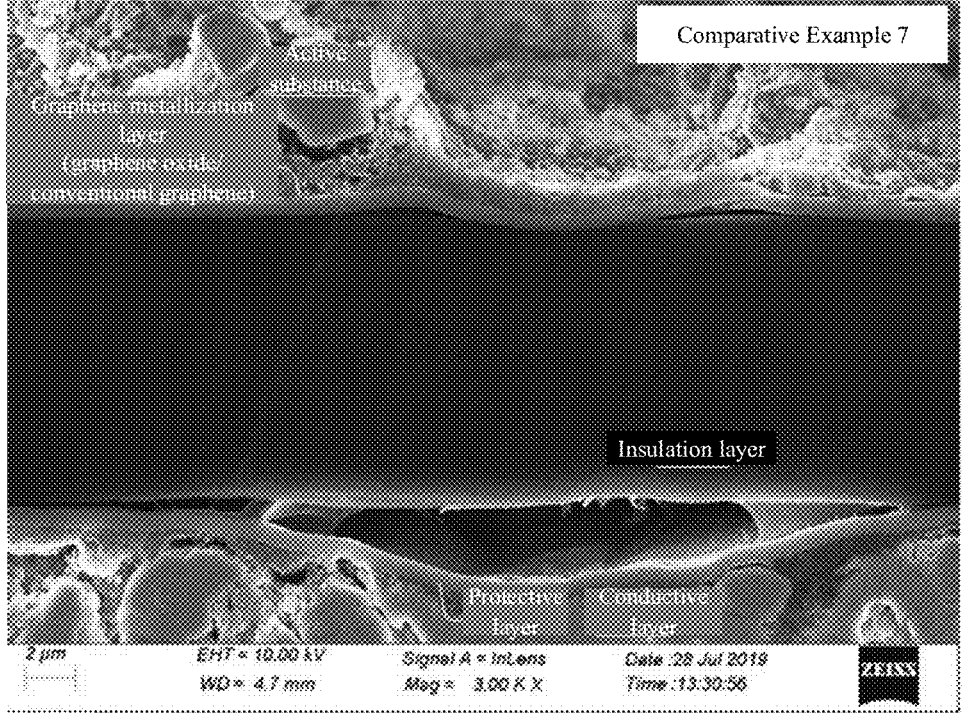
FIG. 10 is a cross-sectional SEM photograph of a composite positive electrode current collector used in Comparative Example 7 after 1000 times of charging and discharging.

Current collectors in batteries of Example 03 and Comparative Example 7 were taken out after the cycle test, and cross-sections (FIGS. 9 and 10) were observed by SEM, and it was found that a conductive layer in a cross-section (FIG. 9) of Example 03 is in firm contact with a protective layer through a graphene metallization layer, and no falling off of the conductive layer is observed. However, in a cross section (FIG. 10) of Comparative Example 7, significant falling off of a conductive layer was observed. From this, it can be speculated that improvement of a battery cycle life in the Example is due to improvement of a binding force of various layers in a current collector.

The preferable embodiments of the present application are disclosed above but are not used to limit the claims. Those skilled in the art may make possible changes and modifications without departing from the concept of the present application. Therefore, the protection scope of the present application is defined by the attached claims.

What is claimed is:

1. A composite positive electrode current collector, comprising:
   an insulation layer; and
   a protective layer, a graphene metallization layer, and a conductive layer arranged in sequence on a surface of the insulation layer in a direction away from the surface of the insulation layer,
   wherein the protective layer comprises a metal oxide, and the graphene metallization layer contains highly reduced graphene oxide having an oxygen-containing organic group.

2. The composite positive electrode current collector according to claim 1, wherein
   the highly reduced graphene oxide comprises graphene having two to six layers.

3. The composite positive electrode current collector according to claim 1, wherein
   the oxygen-containing organic group comprises at least one of a hydroxyl group, an aldehyde group, a ketone group, a carboxyl group, or an ether group.

4. The composite positive electrode current collector according to claim 1, wherein
   a thickness of the highly reduced graphene oxide is in a range of 0.5 nm to 7 nm.

5. The composite positive electrode current collector according to claim 1, wherein
   under a situation that the highly reduced graphene oxide is subjected to Raman detection, a characteristic peak D is observed at 1200 cm$^{-1}$ to 1400 cm$^{-1}$, a characteristic peak G is observed at 1500 cm$^{-1}$ to 1600 cm$^{-1}$, and a peak intensity ratio I(D)/I(G) of an intensity I(D) of the characteristic peak D to an intensity I(G) of the characteristic peak G is 1.2 or less.

6. The composite positive electrode current collector according to claim 1, wherein
   a contact angle of the highly reduced graphene oxide with respect to water is 90° or more.

7. The composite positive electrode current collector according to claim 1, wherein
   an electron mobility of the highly reduced graphene oxide at room temperature is 1×10$^4$ cm$^2$/(V·s) to 1×10$^5$ cm$^2$/(V·s).

8. The composite positive electrode current collector according to claim 1, wherein
   a thermal conductivity coefficient of the highly reduced graphene oxide is 2×10$^2$ W/(m·K) to 9×10$^4$ W/(m·K).

9. The composite positive electrode current collector according to claim 1, wherein
   a specific surface area of the highly reduced graphene oxide is 50 m$^2$/g to 1000 m$^2$/g.

10. The composite positive electrode current collector according to claim 1, wherein
    fracture strength of the highly reduced graphene oxide is 20 GPa to 110 GPa.

11. The composite positive electrode current collector according to claim 1, wherein
    the metal oxide of the protective layer comprises at least one of aluminum oxide, cobalt oxide, chromium oxide, or nickel oxide.

12. The composite positive electrode current collector according to claim 1, wherein
    the conductive layer contains a metallic conductive material, and the metallic conductive material is selected from at least one of aluminum, copper, nickel, titanium, silver, nickel-copper alloy, or aluminum-zirconium alloy.

13. The composite positive electrode current collector according to claim 1, wherein
    the insulation layer contains an organic polymer insulation material, and is selected from at least one of polyamide, polyethylene terephthalate, polyimide, polyethylene, polypropylene, polystyrene, polyvinyl chloride, acrylonitrile butadiene styrene copolymers, polybutylene terephthalate, poly-p-phenylene terephthamide, ethylene propylene copolymer, polyformaldehyde, epoxy resin, phenol-formaldehyde resin, polytetrafluoroethylene, polyvinylidene fluoride, silicon rubber, or polycarbonate.

14. The composite positive electrode current collector according to claim 1, wherein
    the graphene metallization layer is formed by coating a slurry comprising the highly reduced graphene oxide and a binder in one or more methods of gravure coating, spraying, and soaking,
    the binder comprises one or more of glycidyl methacrylate, polyvinylidene fluoride, styrene-butadiene rubber latex, polytetrafluoroethylene, polyolefin, polyimide, and polyurethane, and
    a solid content concentration of the slurry is 5% by weight to 30% by weight, and a proportion of the highly reduced graphene oxide in the solid content is 10% by weight to 35% by weight.

15. An electrode plate, comprising
    the composite positive electrode current collector according to claim 1.

16. A secondary battery, comprising the electrode plate according to claim 15.

17. A battery module, comprising the secondary battery according to claim 16.

18. A battery pack, comprising the battery module according to claim 17.

19. A power consumption apparatus, comprising the battery pack according to claim 18.

\*    \*    \*    \*    \*